3,070,430
COMBUSTION CHAMBER DEPOSIT MODIFIERS
FOR LEADED GASOLINES
William E. Lovett, Scotch Plains, and Frank C. Gunderloy, Jr., New Brunswick, N.J., assignors to Esso Research and Engineering Company, a corporation of Delaware
No Drawing. Filed Dec. 29, 1958, Ser. No. 783,186
9 Claims. (Cl. 44—69)

The present invention relates to fuels for use in internal combustion engines and more particularly relates to leaded gasolines having incorporated therein combustion chamber deposit modifiers which effectively reduce surface ignition, spark plug misfiring and related phenomena attributable to the formation of combustion chamber deposits in gasoline engines and the same time affect gasoline octane quality to a significantly lesser extent than do additives employed in the past.

Tetraethyl lead, tetramethyl lead, methyltriethyl lead, dimethyl diethyl lead and similar alkyl lead compounds employed as gasoline antiknock agents are known to cause combustion chamber deposits in gasoline engines. The deposits formed as a result of the presence of these compounds in gasolines consist primarily of unburned carbon, lead salts and lead oxides which rapidly accumulate upon the pistons, cylinder heads, valves, spark plug insulators and other surfaces within the engine combustion chambers. Because they have relatively low ignition temperatures, such deposits become incandescent during engine operation and cause surface ignition, which is a premature igniting of the fuel-air mixture during the compression stroke of the engine. The deposits also foul the spark plugs, causing them to misfire, and are responsible, over a period of time, for a considerable increase in the fuel octane quality required for satisfactory engine operation. The adverse effects of such combustion chamber deposits are particularly pronounced in gasoline engines having compression ratios above about 9 to 1 and include "rumble," which is a particular type of engine vibration cause by improper fuel combustion, and other phenomena not normally encountered in engines having lower compression ratios.

In order to minimize the formation of combustion chamber deposits in gasoline engines operated upon leaded fuels, lead antiknock agents are used in gasolines in conjunction with scavenger agents designed to react with the lead during combustion and form volatile products which will be readily swept from the engine combustion chamber with the exhaust gases. The compounds generally used as scavenger agents in this manner are alkyl halides, particularly ethylene dichloride, ethylene dibromide and mixtures of the two. Although such scavenger agents do reduce the amount of deposits formed, they do not eliminate the difficulties referred to above. Many of the halogen-containing lead compounds formed as a result of reactions between the lead antiknock agents and the halohydrocarbon scavengers are solids at temperatures prevailing within the combustion chamber and are included in the deposits formed. These compounds tend to further reduce the ignition temperature of the deposits and hence may actually promote surface ignition and related difficulties.

In order to reduce the adverse effects of combustion chamber deposits to a greater extent than is possible by the use of halohydrocarbon scavenger agents alone, certain phosphorus compounds have also been used in leaded gasolines. These compounds, like the halohydrocarbons, enter into reactions with the lead during combustion but their action is somewhat different in that they are primarily intended to form solid lead-phosphorus compounds rather than gaseous reaction products. Deposits containing the lead-phosphorus reaction products in general have very high ignition temperatures and hence are much less prone to cause surface ignition than are deposits containing no phosphorus. There are indications in the literature that the quantity of deposits formed may also be reduced through the use of phosphorus additives in leaded gasolines.

The phosphorus compounds employed as combustion chamber deposit modifiers in leaded gasolines in the past have generally been limited to esters containing cyclic hydrocarbon constituents, despite the fact that the corresponding noncyclic phosphorus esters reduce surface ignition and other difficulties caused by combustion chamber deposits and are better suited for use as gasoline additives than are the cyclic esters because of their lower boiling points and greater solubility in gasoline. Alkyl phosphorus esters seriously affect the octane quality of leaded fuels to which they are added, a characteristic which largely offsets the advantages gained through using phosphorus additives. It is thought that the alkoxy groups in alkyl phosphorus esters react with tetraethyl lead and similar lead compounds in gasoline to form lead alkoxides. The lead alkoxides do not behave as antiknock agents and hence their formation may result in a decrease in the octane rating of the gasoline which is equivalent to the increase effected initially by the addition of the antiknock agent. Aromatic and aryl-substituted phosphorus esters, on the other hand, apparently react with lead antiknock agents to a lesser extent and therefore have a less serious effect upon leaded gasoline octane quality.

This effect of alkyl phosphorus esters upon the octane quality of leaded gasolines is of paramount importance because of the high fuel octane levels required for satisfactory operation of modern gasoline engines. The cost of raising fuel octane quality becomes increasingly high as the octane level increases. Because of this cost, additives which depress octane quality significantly cannot be tolerated and therefore, in spite of the fact that they have superior physical properties, noncyclic esters of phosphorus have not been used commercially as combustion chamber modifiers in leaded gasolines.

The present invention provides a new and improved class of phosphorus additives for use in leaded gasolines which are effective in reducing octane requirement increase, surface ignition, spark plug fouling and related difficulties attributable to the formation of combustion chamber deposits, which do not seriously affect the octane quality of the gasolines to which they are added, and which are relatively inexpensive and therefore attractive from an economic standpoint. The invention is based upon the discovery that the octane degradation characteristics of alkyl phosphorus esters are not shared by the corresponding alkenyl esters and that such alkenyl esters have surprisingly little effect upon gasoline octane quality. The reason for this is not fully understood at the present time but it is thought that the presence of the double bond in the alkenyl groups reduces the reactivity of the oxygen in the phosphorus ester linkage. As a result of this reduced reactivity, the lead compounds react to form alkoxy derivatives to a lesser extent than when alkyl esters of phosphorus are employed and thus retain their antiknock properties. The unsaturated esters of the invention are also advantageous for use as gasoline because of their excellent rust inhibiting properties, which are generally superior to those of many other phosphorus compounds. The invention thus provides phosphorus additives which possess the relatively low boiling point and high gasoline solubility advantages of alkyl phosphorus esters proposed for use as combustion chamber deposit modifiers in the past but which are free of the undesirable feature which has prevented the commercial utilization of aliphatic phosphorus compounds heretofore.

The alkenyl phosphorus esters which are employed as combustion chamber deposit modifiers in gasolines containing alkyl lead antiknock agents and halohydrocarbon scavengers in accordance with the invention are trialkenyl esters of acids selected from the group consisting of phosphoric acid and phosphorus acid wherein the alkenyl groups each contain from about 2 to about 5 carbon atoms. The additive compounds thus include trivinyl phosphate and phosphite, triallyl phosphate and phosphite, tributenyl phosphate and phosphite and tripentenyl phosphate and phosphite. In the case of the $C_4$ and $C_5$ alkenyl esters, these preferably have the double bond allylic to the oxygen, that is, the esters are derived from crotyl alcohol and pentene-2-ol-1, respectively. Of the trialkenyl compounds, the triallyl esters have been found to be particularly effective and are therefore preferred for purposes of the invention.

Trialkenyl phosphates and phosphites employed as combustion chamber deposit modifiers in leaded gasolines in accordance with the invention may be prepared by conventional methods employed in the preparation of phosphorus esters. The triallyl and higher esters may, for example, be prepared by the reaction of a phosphorus halide or phosphorus oxy-halide with the desired alkenyl alcohol. If the phosphorus halide is employed, the reaction product will be a trialkenyl phosphite. Reaction of phosphorus oxy-halides with alkenyl alcohols results in the formation of trialkenyl phosphates. Such reactions may be carried out at temperatures in the range of from about −30° F. to about 75° F., preferably about −10° F. to about 10° F., under conditions to maintain the reactants in liquid phase. It is generally preferred to carry out the reaction in the presence of an inert solvent such as benzene, xylene, pyridine or the like. The reaction product will normally be recovered after a period of from about 2 to about 8 hours. It is generally preferred to filter the reaction mixture to remove any solids and polymerize material formed in the reaction, after which the product may be water-washed, distilled and further purified by methods familiar to those skilled in the art. Other alkenyl esters can be prepared by similar methods familiar to those skilled in the art.

The gasolines in which the trialkenyl esters of acids of phosphorus are employed in accordance with the invention are conventional leaded gasolines such as those marketed commercially for use in internal combustion engines. Such gasolines are broadly classified as either motor gasolines or as aviation gasolines. Motor gasolines are defined by ASTM Specification D–439–56T and are classified as Type A, Type B or Type C, depending upon the service for which the fuel is intended. Normally, motor gasolines boil between about 80° F. and about 450° F. and have octane numbers ranging from about 83 on the Research scale to about 105 or higher. Aviation gasolines have properties similar to those of motor gasoline but in general have narrower boiling ranges and somewhat more rigid specifications. Specifications for aviation gasolines are set forth in Military Specification MIL–F–5572.

The concentration of tetraethyl lead, tetramethyl lead, or similar tetraalkyl lead antiknock agent in the gasolines with which the invention is concerned may range from about 2.0 to about 4.6 cc. per gallon. The gasolines to which the invention relates also contain, in addition to the lead antiknock agents, halohydrocarbon scavenger agents boiling in the range between about 50° C. and about 250° C. Suitable halohydrocarbon compounds for use as scavenger agents include alkyl halides such as chlorobromo methane, tetrabromo acetylene, trichloro ethylene, ethylene dichloride and ethylene dibromide; alicyclic halogenated hydrocarbons such as chlorocyclopentane and trichlorocyclopentane; aromatic halogenated hydrocarbons such as chloro benzene, dibromo benzene, dibromo toluene; and mixtures of such halogenated hydrocarbon compounds. All of the above halohydrocarbons are not equally effective for use as lead scavengers in gasolines. Ethylene dichloride, ethylene dibromide and mixtures thereof are particularly effective because of their volatility properties and chemical stability and are therefore preferred scavenger agents for use in accordance with the invention.

Halohydrocarbon scavengers are employed in the gasolines of the invention in amounts ranging from about 0.5 to about 3.0 theories, based on the lead content of the gasoline. Scavenger concentrations of from about 1.5 to about 2.0 theories are preferred. The expression of scavenger content in terms of theories is conventional practice and will be familiar to those skilled in the art. One theory is the amount of scavenger which is stoichiometrically equivalent to the lead in the gasoline. A theory of hydrocarbon scavenger is thus the amount of scavenger required to react stoichiometrically with a given amount of lead antiknock agent so that all of the lead and all of the halogen atoms react to form lead halides.

The amount of trialkenyl phosphate employed in the gasolines of the invention may also be expressed in terms of theories. One theory of the phosphorus ester is the amount of the ester which will react stoichiometrically with all of the lead atoms present to form $Pb_3(PO_4)_2$. The trialkenyl phosphates and phosphites are incorporated into the leaded gasolines of the invention in concentrations ranging from about 0.05 theories to about 1.0 theory, based on the lead content of the fuel. Concentrations between about 0.1 theory and about 0.4 theory are preferred. The total theories of phosphorus, chlorine, and bromine in the gasoline may range from about 0.55 to about 4.0 theories but will preferably fall between about 1.6 and about 2.4 theories. The theories of halohydrocarbon present in the gasolines of the invention and the theories of trialkenyl phosphate or phosphite employed should be such that their ratio falls between about 3 to 2 and about 32 to 1. From about 3 to about 10 theories of halohydrocarbon per theory of trialkenyl phosphate or phosphite are particularly effective.

The trialkenyl phosphates and phosphites may be employed in leaded gasolines in accordance with the invention in conjunction with a variety of other additives in addition to the halohydrocarbon scavenger agents employed in such gasolines. Such additives include, for example, solvent oils, corrosion inhibitors, gum inhibitors, anti-icing agents, dyes, dye stabilizers and similar additive materials.

The trialkenyl phosphates and phosphites are soluble in gasolines and may, therefore, be added directly to leaded fuels in order to achieve the benefits of the invention. In many cases, however, it will be preferred to combine the phosphorus esters with tetraethyl lead, halohydrocarbon scavenger agents and other additive materials in an additive concentrate which may then be added to the gasoline. Such a concentrate may contain from about 0.05 to about 1.0 theory of the phosphorus ester and from about 0.5 to about 3.0 theories of the hydrocarbon scavenger agent and may include other additive agents such as those described in the preceding paragraph. A typical concentrate containing tetraethyl lead and the additive materials of the invention may have the following composition:

| | Wt. Percent |
|---|---|
| Tetraethyl lead | 45.5 |
| Triallyl phosphate | 6.8 |
| Ethylene dibromide | 22.8 |
| Ethylene dichloride | 21.6 |
| Gum inhibitor, dye, dye stabilizer, etc. | 3.3 |

It will be understood that the above composition is intended to illustrate concentrate compositions containing tetraethyl lead, halohydrocarbon scavenger agents and trialkenyl phosphate or phosphite which may be added to gasolines in accordance with the invention but does not limit the compositions which may be used. The theories of the phosphorus ester and the halohydrocarbon scavenger in such concentrates may be varied within the ranges set forth above.

The invention may be further illustrated by the following examples.

EXAMPLE 1

A leaded gasoline and a sample of the same gasoline containing 0.2 theory of triallyl phosphate were tested in a 1957 Oldsmobile car having a compression ratio of 9.5/1 in order to determine the effectiveness of the tri-alkenyl phophorus esters of the invention for reducing the adverse effects of combustion chamber deposits upon the operation of modern gasoline engines. The base fuel employed in these tests was a gasoline having a Research Octane Number of 104.5 and a Motor Octane Number of 95. The gasoline contained 3 cc. of tetraethyl lead per gallon and 1.5 theories of halohydrocarbon scavenger agent consisting of 1.0 theory of ethylene dichloride and 0.5 theory of ethylene dibromide. Typical inspections of this gasoline are as follows:

A.S.T.M. distillation D-86:
| | |
|---|---|
| Initial boiling point _____°F__ | 97 |
| 10% boiling point _____°F__ | 137 |
| 50% boiling point _____°F__ | 223 |
| 90% boiling point _____°F__ | 275 |
| Final boiling point _____°F__ | 324 |
| Reid vapor pressure _____p.s.i__ | 7.45 |
| A.P.I. gravity _____ | 59.5 |
| General Motors gum _____ | 1.6 |
| Research octane number _____ | 104.5 |
| Motor octane number _____ | 95.0 |

The test was carried out by first removing all deposits from the automobile engine. The car was then operated on the leaded base gasoline during about 10,000 miles of driving under average conditions such as those encountered during city and suburban driving at speeds in the range of from about 15 to about 50 miles per hour. When it had been determined that the octane requirement of the engine due to the formation of combustion chamber deposits had reached an equilibrium value, tests were made to determine the minimum octane number fuel which could be used in the engine without surface ignition occurring. Commercial reference fuels were used in carrying out these tests. It was found that, although the clean engine exhibited no surface ignition whatsoever, a reference fuel of 98.3 Research Octane Number was required for operation without surface ignition after deposits had been built up by using the base gasoline.

The test was then continued using the same base gasoline modified by the addition thereto of 0.2 theory of triallyl phosphate. After the car had been operated for a total of 3300 miles, the fuel octane requirement necessary for the prevention of surface ignition was again determined by means of tests carried out with the reference fuels. These tests showed that the octane requirement of the engine had been reduced from an equilibrium value of 98.3 to a value of only 96.7. The use of the triallyl phosphate thus effected a reduction in octane requirement of 1.6 Research Octane Numbers after only 3300 miles of operation on a gasoline containing the additive. It is thus apparent that trialkenyl esters of phosphorus are effective combustion chamber deposit modifiers when used in leaded gasolines.

The data obtained in the above described tests are summarized in Table I below:

*Table I*

EFFECT OF TRI-ALKENYL PHOSPHORUS ESTERS UPON SURFACE IGNITION

| Fuel | Surface ignition-free octane requirement | Δ requirement due to additive |
|---|---|---|
| Base gasoline | 98.3 | |
| Base gasoline + 0.2 T tri-allyl phosphate | 96.7 | −1.6 |

EXAMPLE 2

In order to demonstrate the surprisingly low octane quality debit encountered when tri-alkenyl esters of phosphoric and phosphorus esters are employed as additives for reducing combustion chamber deposits, a series of tests were carried out wherein a number of base gasolines containing tri-allyl phosphate, tri(n-propyl) phosphate and tri(n-butyl) phosphate in various concentrations were matched against primary reference fuels to determine their octane ratings. Similar tests of the base gasolines themselves were made in order to determine the effect of the additives on the octane quality of the fuel. The gasolines used had Research Octane Numbers ranging from 87 to 101.5 and Motor Octane Numbers ranging from 85 to 89.5, all of the gasolines containing 3 cc. of tetraethyl lead per gallon, 1.0 theory of ethylene dichloride and 0.5 theory of ethylene dibromide. Most of the tests were repeated several times in order to assure accuracy of results. The test methods employed are described as Coordinating Research Council Methods CRC-F-1-545 and CRC-F-2-545. Both of these methods are widely known and used in the petroleum and automotive industries for determining gasoline octane quality. The data obtained are shown in the following Table II:

*Table II*

EFFECT OF TRI-ALKENYL PHOSPHORUS ESTERS UPON GASOLINE OCTANE QUALITY

| Additive | Research octane number | | | Motor octane number | | | Number of determinations |
|---|---|---|---|---|---|---|---|
| | Base gasoline | Base gasoline plus additive | ΔR.O.N. due to additive | Base gasoline | Base gasoline plus additive | ΔM.O.N. due to additive | |
| Tri-allyl phosphate, 0.2 T | 101.50 | 101.41 | −0.09 | 89.50 | 89.41 | −0.09 | 12 |
| Tri-n-propyl phosphate, 0.2 T | 101.50 | 101.35 | −0.15 | 89.50 | 89.28 | −0.22 | 12 |
| Tri-isopropyl phosphate, 0.2 T | 101.50 | 101.07 | −0.43 | 89.50 | 88.66 | −0.84 | 5 |
| Tri-allyl phosphate, 1.0 T | 101.50 | 101.07 | −0.43 | 89.50 | 87.72 | −1.78 | 6 |
| Tri-n-propyl phosphate, 1.0 T | 101.50 | 100.85 | −0.65 | 89.50 | 87.03 | −2.47 | 6 |
| Tri-isooctyl phosphate, 1.0 T | 101.50 | 100.80 | −0.70 | 89.50 | 87.50 | −2.00 | 3 |
| Tri-allyl phosphate, 0.2 T | 98.50 | 98.26 | −0.24 | 88.50 | 88.12 | −0.38 | 12 |
| Tri-n-propyl phosphate, 0.2 T | 98.50 | 98.19 | −0.31 | 88.50 | 87.87 | −0.63 | 12 |
| Tri-allyl phosphate, 1.0 T | 98.50 | 97.68 | −0.82 | 88.50 | 86.77 | −1.73 | 6 |
| Tri-n-propyl phosphate, 1.0 T | 98.50 | 97.43 | −1.07 | 88.50 | 86.23 | −2.27 | 6 |
| Tri-allyl phosphate, 1.0 T | 87.00 | 86.85 | −0.15 | 85.00 | 83.20 | −1.80 | 1 |
| Tri-n-butyl phosphate, 1.0 T | 87.00 | 85.80 | −1.2 | 85.00 | 81.70 | −3.30 | 1 |

As can be seen from the above data, tri-allyl phosphate has surprisingly lower octane degradation characteristics than do tri (n-propyl) phosphate, tri-isopropyl phosphate and tri (n-butyl) phosphate or tri-isooctyl phosphate, closely related trialkyl phosphorus esters. This effect is of considerable importance in view of the cost of providing gasolines with additional octane quality in order to overcome the octane degradation encountered with conventional phosphorus additives. As a result, tri-alkenyl phosphorus esters are much more attractive for use in leaded gasolines than the corresponding trialkyl esters.

EXAMPLE 3

Further tests were carried out to determine the effect of tri-alkenyl phosphorus esters upon the road ratings obtained with modern high compression automobiles operated on high octane leaded gasolines. The ratings were carried out by the standard Uniontown method using a 1956 Buick having a compression ratio of 11.8 to 1 and a 1957 Crysler having a compression ratio of 11.0 to 1. Parallel tests were carried out with tri (n-propyl) phosphate in order to furnish a basis for comparing the effectiveness of the additive of the invention. The results are shown in Table III below:

*Table III*

EFFECT OF TRI-ALKENYL PHOSPHORUS ESTERS UPON UNIONTOWN OCTANE RATINGS

| Fuel | $\Delta$Uniontown octane number [1] | |
|---|---|---|
| | 1956 Buick | 1957 Chrysler |
| Base gasoline plus 1.0 T. tri-allyl phosphate | +0.4 | −0.0 |
| Base gasoline plus 1.0 T. tri-n-propyl phosphate | −1.1 | −0.7 |

[1] Difference between base gasoline octane rating and additive fuel octane rating.

The data in the above table show that the use of one theory of tri-allyl phosphate in the gasoline actually produced an octane bonus of 0.4 octane number in the 1956 Buick, rather than the expected octane debit. In the 1957 Chrysler, the presence of the additive did not produce any change in the octane rating obtained. The use of a similar quantity of tri-n-propyl phosphate, on the other hand, seriously reduced the octane rating in both automobiles. These data clearly demonstrate the surprising superiority of the additives of the invention over the closely related alkyl phosphates suggested in the prior art.

What is claimed is:

1. A gasoline having incorporated therein from about 2.0 to about 4.6 cc. of a tetraalkyl lead antiknock agent per gallon, from about 0.5 to about 3.0 theories of a halohydrocarbon scavenger agent boiling between about 50° C. and about 250° C., and from about 0.05 to about 1.0 theory of a tri-allyl ester of an acid selected from the group consisting of phosphoric acid and phosphorus acid.

2. A gasoline as defined by claim 1 wherein said ester is a phosphate.

3. A gasoline as defined by claim 1 wherein said antiknock agent is tetraethyl lead.

4. A gasoline as defined by claim 1 wherein said scavenger agent is a mixture of ethylene dichloride and ethylene dibromide.

5. A gasoline as defined by claim 1 containing from about 1.2 to about 2.0 theories of a mixture of ethylene dichloride and ethylene dibromide as said scanger agent.

6. A gasoline as defined by claim 1 containing from about 0.1 to about 0.4 theories of said ester.

7. A gasoline additive concentrate consisting essentially of tetraethyl lead, from about 0.5 to about 3.0 theories of a halohydrocarbon scavenger agent boiling between about 50° C. and about 250° C., and from about 0.05 to about 1.0 theory of a tri-allyl ester of an acid selected from the group consisting of phosphoric acid and phosphorus acid.

8. A concentrate as defined by claim 7 wherein said ester is tri-allyl phosphate.

9. A concentrate as defined by claim 7 containing from about 0.1 to about 0.4 theories of said ester.

References Cited in the file of this patent

UNITED STATES PATENTS

| 2,394,829 | Whitehill et al. | Feb. 12, 1946 |
| 2,405,560 | Campbell | Aug. 13, 1946 |
| 2,427,173 | Withrow | Sept. 9, 1947 |
| 2,728,791 | Rowlands | Dec. 27, 1955 |
| 2,852,551 | Hechenbleickner | Sept. 16, 1958 |
| 2,860,958 | Gilbert | Nov. 18, 1958 |
| 2,911,431 | Orloff et al. | Nov. 3, 1959 |

FOREIGN PATENTS

| 733,820 | Great Britain | July 20, 1955 |

OTHER REFERENCES

Ind. and Eng. Chem., March 1948, vol. 40, No. 3, "Suitability of Gasolines as Fuel," by James et al., pages 405–411.

Ind. and Eng. Chem., March 1951, vol. 43, No. 3, "Antiknock Antagonists," by Livingston, pages 663–670.